Oct. 26, 1954
C. H. WALKER
2,692,792
SEALING STRIP FOR VENTILATOR WINDOWS
Filed March 22, 1952
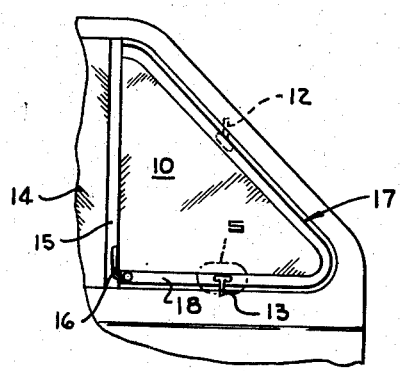
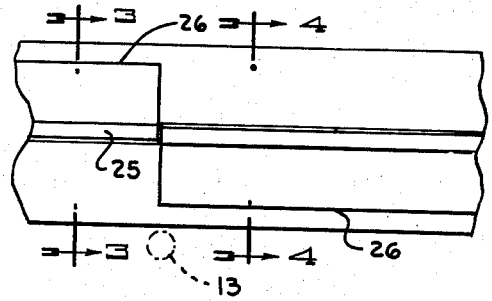
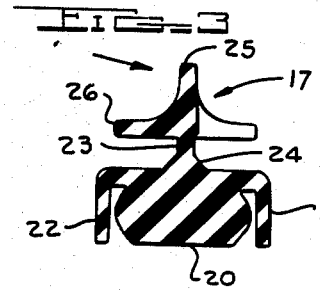
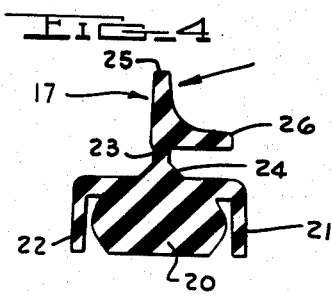
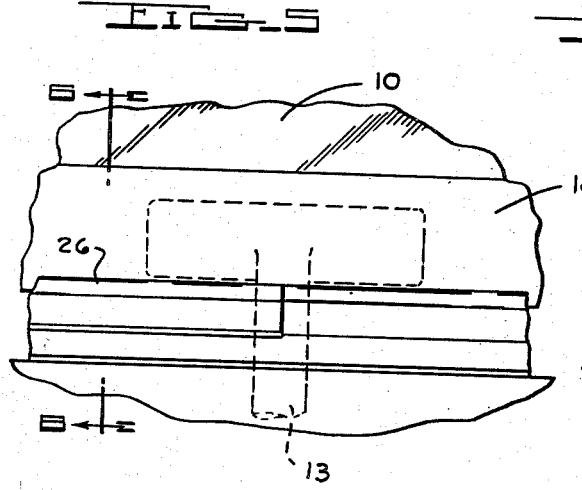
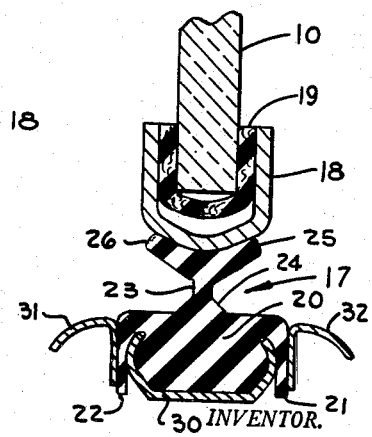
INVENTOR.
CHARLES H. WALKER
BY
*Arthur W. Smith*
ATTORNEY

Patented Oct. 26, 1954

2,692,792

UNITED STATES PATENT OFFICE 2,692,792

SEALING STRIP FOR VENTILATOR WINDOWS

Charles Henry Walker, Novi Township, Oakland County, Mich.

Application March 22, 1952, Serial No. 277,930

6 Claims. (Cl. 296—44)

The present invention relates to a weather seal. In the particular embodiment here disclosed by way of example, the present invention is shown as adapted for use in sealing the clearance space between the bottom, top and inclined edge portions of a pivoted window and the corresponding portions of the window opening when the window is closed.

The present application covers a modification of the invention shown in my co-pending application Serial No. 277,929, filed March 22, 1952, for a weather seal.

In automobile bodies, pivoted windows are widely utilized to permit ventilation of the automobile body by swinging said windows about pivots. In so swinging the pivoted window the portion of the window forward of the pivots is moved inwardly of the body and the portion of the window rearward of the pivots is moved outwardly of the body. To make possible such swinging movement of the window, it is necessary to provide a clearance space between the window opening and the pivoted window. In order to prevent rain, wind and dust from entering the car when the pivoted window is closed, it is necessary that means be provided for sealing this clearance space.

A conventional type of sealing member that has been used extensively for such sealing purposes consists of a molded rubber member mounted in a metal channel shaped to follow the contour of the framed portions of the glass panel of the pivoted window. Such a sealing member consists primarly of a base from which integral flexible sealing lips or flanges, having one flat face, extend inwardly into the window opening and contact opposite side faces of the window channel or frame forward and rearward of the window pivots. Due to the fact that the front portion of the pivoted window swings outward when closing and that the rear portion of the pivoted window swings inward when closing, it is necessary, due to the thickness of the framed window panel, to place the said sealing lips or flanges off center, i. e. the extending sealing lips or flanges intended to seal the forward portion of the pivoted window are located on the outer side of the mounted base forward of the pivots and the extending sealing lips or flanges intended to seal the rear portion of the pivoted window are located on the inner side of the mounted base rearward of the pivots. So placed, the sealing lips or flanges contact opposite faces of the glass panel frame or channel when the window is closed to effect a seal. Due to the design of this type of sealing member, considerable manual effort is required to close the window and make the sealing lips or flanges effective as a weather seal.

Due to the necessary design and bulkiness and necessary method of manufacturing this sealing member, it is ill fitting and does not provide a satisfactory, effective weather-tight seal when the window is closed. Due to the necessary design of this conventional type of sealing member, it must be molded which is a time-consuming and costly procedure. Furthermore, due to the opposite directional movement of the left and right pivoted windows, a separate mold is necessary to produce each different type and shape of sealing member required. Due to the various models and large quantities of automotive vehicles produced, it is necessary to maintain a large number of costly molds resulting in a substantial investment on the part of the manufacturer.

As distinguished from such conventional sealing members the present invention contacts the periphery of the window frame or channel when the window is closed to provide a new and improved weather-tight sealing of the clearance space between the pivoted window and the window opening.

In its preferred embodiment here disclosed by way of example, the weather seal of the present invention is formed of a resilient material and has longitudinally extending arms of such cross-sectional contour that the seal conforms readily within allowed production limits to the variations between the window frame and the window opening. The weather seal at all times is readily responsive to the displacing pressures exerted thereon by the periphery of the pivoted window frame to effect the desired weather-tight seal between the parts. The weather seal of the present invention, acting as it does when contacted by the periphery of the window channel or frame, requires no extending sealing lips or flanges which overlie the sides of the window channel or frame. Thus, the present invention provides a neat, symmetrical, trim line between the window channel or frame and both the interior and exterior moldings which case the window opening.

In one embodiment of the invention here disclosed, the weather seal consists of a resilient sealing member of continuous cross-sectional form, the primary parts of which are a base for mounting and a sealing bead. The sealing bead as here shown is substantially L shape in cross-section to provide a pair of spaced arms angularly disposed to each other. The sealing bead is connected to the base by a flexible web-like neck located substantially at the center line of the transverse face of the base.

In modern automobile bodies, it is common practice to provide front window openings in the doors and to provide rear window openings either in the doors or in the vehicle body. A window is pivoted in such openings for movement about a substantially vertical axis so that when closed it can lie in alignment with the window opening or the sliding window panel which may fill a portion of the opening. When swung about its pivot, such pivoted window will occupy positions at various angles to the plane of the window opening to act as a ventilator. In some instances, the pivoted window may fill the entire window opening.

Such automobile ventilating windows are provided with molded resilient sealing members of the conventional type heretofore described which extend part way or entirely around the window opening and have lips or flanges having one flat face which overlies and seats against one face of the window channel or frame when the window is closed. To secure a positive sealing effect when the window is in closed position, it is necessary to press the window angularly against the said lip or flange portions of the said sealing member. A sufficient pressure to achieve a sealing effect thus exerted between the window frame or channel and the lip or flange portions of the sealing member frequently causes displacement of the sealing contact at some point and destroys the effectiveness of the weather seal.

Another disadvantage inherent in the conventional construction is that the extending sealing lips or flanges extend onto and cover part of the face of the bottom section of the pivoted window frame or channel when the window is closed. This makes it impossible to mount the conventional locking handle on the face of the window frame or channel in the most effective position, and this necessitates the use of a mounting bracket attached to the window frame and to which the locking handle is fastened, thereby raising the position of the locking handle above the top edge of the sealing flange to avoid interference. The necessary construction for so mounting the locking handle adds considerably to the cost of manufacturing such pivoted windows.

The conventional locking handle engages either a latch plate provided on the garnish molding or engages one face of the upright divider bar conventionally provided for contacting one side of the pivoted window to lock the pivoted window in its closed position. Pressure of the locking handle against said plate provided on the garnish molding or the division bar and has a tendency to spring the mounting plate away from the window, frequently resulting in an unsightly and mechanically inadequate construction.

The above-described conventional sealing member when used for such pivotal windows is subject to the further disadvantage that the molded sealing members are not uniform in shape throughout their length. Pivotal windows conventionally are mounted for pivotal movement about a substantially vertical axis disposed at substantially the middle thereof. The lip or flange portions of the molded members at opposite sides of the pivotal axis are necessarily disposed at opposite sides of the window frame or channel. This means that each sealing member must be separately formed and molded in a time-consuming and relatively costly molding operation. In order to supply the large number of automobiles of the various types and styles produced, it is necessary for the manufacturer of such sealing members to maintain a large variety of costly molds. The sealing members at opposite sides of the automobile body are different because of the right and left swinging of the windows. Also, if provided for the rear windows, a different sealing member is required. Thus, as many as four different molds may be required to provide sealing strips for four locations for each car. Since the windows of different car models may be diffeernt in size and in some instances different in shape, it is seen that a variety of molds must be provided. The mold cost thus adds substantially to the cost of providing such sealing members.

Inevitable variations in manufacture and installation of such conventional sealing members are such that an imperfect seal frequently results. Due to the required placement of the overlying lips or flanges, the portion of the pivoted window rearward of its pivots is sealed only on the inside face of the window frame or channel, and the portion of the pivoted window forward of its pivots is sealed only on the outside face of the window channel or frame. Thus, any imperfection in the sealing action of the lip or flange with the side of the window channel or frame permits leakage directly to the interior of the car. This is particularly troublesome when the pivoted window is closed and the car is driven in dust or rain storms or is subjected to high water pressures as occurs when the car is washed.

The sealing member embodying the present invention preferably extends around the window opening at all points where it is desired to seal the window with such a member. In some instances, this includes a line extending from a point adjacent the divider bar at the top around the pivoted window opening and terminating at a point adjacent the divider bar at the bottom. The pivoted window turns about an axis which passes through the top and bottom pivots located as required to permit the desired opening and closing of the window. In some instances, these pivots are located approximately half way in the length of the frame portions to which they are attached. In other instances, the pivots are located near one end of the pivoted window. In certain installations, the pivots for the pivoted window may be disposed at the side of the window frame so that the sealing member lies in the plane of the window opening. In other instances, the pivots may extend through the sealing bead. In either instance, when the pivoted window is moved from the open to the closed position the part of the periphery of the pivoted window frame in front of the pivot engages one side of the bead of the sealing member and rolls it outwardly and against the periphery of said frame. The part of the pivoted window frame behind the pivot engages the other side of the bead and rolls it inwardly and against the periphery of said frame. In each instance a continuous weather-tight seal is provided between the periphery of the pivoted window frame or channel and the fixed frame associated with the window opening.

The dimensions of the bead of the sealing member and the length of the neck connecting it to the base are such that when the pivoted window panel is closed the side of the bead with which the periphery of the panel frame establishes contact with the periphery of the window frame or channel and the other arm of the bead is tilted into position against the periphery of said window frame or channel to make an effective seal with the periphery of the window frame or channel. This develops a compression force which is exerted on the attaching web or neck.

An important object of the present invention is, therefore, to provide an economical and effective weather seal which is particularly adapted to form a weather-tight seal between an opening and a closure pivotally mounted therein, and in which the sealing effect is achieved in a positive manner on the periphery of the closure without interfering with the pivotal opening movement of the closure member.

It is a further object of the present invention to provide a weather seal which may be manufactured either by conventional extrusion processes or conventional molding processes.

It is another object of the present invention to provide a weather seal for a pivoted closure in which the unstressed sealing bead lies in the same plane as the plane of the transverse center line of the pivoted window when closed and is movable freely in either direction therefrom to generate a sealing contact with the periphery of said closure both forward and rearward of its pivots by bodily displacement of the sealing bead in response to the forces exerted thereon during the angular progressive closing movement of the said closure.

Another object of the present invention is to provide a weather seal of standard form and dimensions which can be readily adapted to seal all the pivotally mounted windows in an automobile body and which may be used as a standardized part to fit various models and makes of automobiles, thus minimizing the number of different sizes and shapes required and eliminating costly molds.

Another object of the present invention is to provide a weather seal of the above-mentioned character which makes possible the mounting of the window locking handle directly on the marginal frame or channel of the window, thus eliminating the special mountings or brackets heretofore required and the disadvantages attending the use thereof.

A further object of the present invention is to provide a weather seal for pivotally mounted windows which provides a neat, symmetrical, trim line and which provides a more effective weather seal than conventional molded sealing members heretofore used for the purpose.

The foregoing and other objects of the present invention are realized by the preferred embodiment of the present invention which consists of a resilient weather seal of continuous cross-sectional form consisting primarily of a mounting body, a substantially L-shaped sealing bead and flexible web-like neck connecting the sealing bead to the mounting body, the weather seal being so mounted in the window opening of a pivotally mounted window that, due to the progressive angular closing action of the window, the substantially L-shaped bead is caused to roll over or twist approximately 45° in the direction of closing movement of the window, thereby bringing both arms of the sealing bead in weathertight sealing contact with the periphery of the glass retaining frame or channel of the window and effecting a sealing of the window on the periphery of the glass retaining frame or channel when the window is closed.

The contour of the bead of the sealing member as here shown is designed to provide suitable sealing contacts with the periphery of the pivotally mounted window. A conventional type of such window channel or frame is formed with a radius on its periphery. For such channels or frames, the bead preferably is substantially L-shaped in cross-sectional contour to provide a central upright arm and a spaced side arm disposed substantially at right angles on one side thereof. The upright arm and the side arm each taper substantially from its outer edge to provide thicker portions at the central juncture point between the arms. The spacing and angular relationship between the side arm and the upright arm is determined by the dimensions and shape of the periphery of the window channel or frame.

Other objects of this invention will appear in the following description and appended claims, reference being had to the accompanying drawings forming a part of this specification, wherein like reference characters designate corresponding parts in the several views.

In the drawings:

Fig. 1 is a fragmentary view of a portion of an automobile body door taken from inside the body and showing a portion of the window opening therein and a sliding window and a closed pivotal window mounted therein, and in which a weather seal embodying the present invention is provided in the clearance space between the periphery of the top inclined edge and bottom of the pivotal window, and the adjacent portions of the window opening;

Fig. 2 is a fragmentary top plan view showing the weather sealing strip embodying my invention.

Figs. 3 and 4 are cross-sectional views taken substantially on the lines 3—3 and 4—4 in the direction of the arrows of Fig. 2.

Fig. 5 is an elevation in an enlarged scale taken from the outside of the vehicle body and showing the area enclosed in broken line 5, in Fig. 1.

Fig. 6 is a cross section taken substantially along the lines 6—6 in the direction of the arrows of Fig. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The pivotally mounted window 10 is here shown as mounted in a portion of the window opening provided in the door 11. It is mounted to pivot with respect to the door on upper and lower pivots 12 and 13. In the construction here shown the rear portion of the pivotally mounted window 10 is adapted to swing outwardly and the forward portion of the window is adapted to swing inwardly of the automobile body. A sliding window 14 is provided for closing the remainder of the window opening in the door 11 and is separated from the pivoted window 10 by a divider bar 15. A window locking handle 16 is provided on the window frame or channel 18.

The weather seal of the present invention is indicated in Fig. 1 by the general numeral 17 and occupies the space between the window opening and the periphery of the frame 18. As shown in Figs. 3, 4 and 6 a weather seal of the present invention comprises a base 20 adapted to be mounted in a fixed channel member 30 (Fig. 6) and is provided with spaced outwardly extending skirt portions 21 and 22 which overlie the edges of the channel 30 and occupy the position as shown in Fig. 6 between the window reveal molding 31 and the inner trim molding 32 to provide an anti-rattle strip between said moldings and the channel 30.

As shown in Figs. 3 and 4, the sealing bead is mounted on a neck 23 which joins the body 20 in the outwardly flared portion 24. The sealing bead is generally L shape in cross section and comprises an upright arm 25 and a side arm 26 disposed substantially at 90° thereto. The sealing bead 17 has a uniform cross-sectional contour throughout its length and may be formed by conventional extruding operation.

The upright arm 25 and the side arm 26 when unstressed occupy the same relative position to each other and are mounted for pivoting as a unit about a point located in the resilient neck portion 23. In mounting the sealing strip in the space between the window opening and the frame or panel 18 of the window 10 the strip is cut and is placed as indicated in Fig. 2 so that the side arm 26 will extend either to the left or to the right of the upright arm 25 as may be required by the position of the sealing member forward and rearward of the window pivots. Thus the side arm 26 is disposed to the left of the upright arm 25 as viewed in Fig. 3 and is disposed to the right of the upright arm 25 as viewed in Fig. 4.

In this manner, the upright arm 25 and the side arm 26 are disposed in the required positions for contact with the peripheral edge of the pivotal window frame 18 when it is moved angularly from its open to its closed position. In a position forward of the pivots 12 and 13 the side arm 26 is disposed as shown in Fig. 4. When the window moves to the closed position as indicated by the arrow, contact is made with the side of the upright arm 25 and this causes the arms 25 and 26 to pivot about a point in the neck portion 23 and causes the side arm 26 to be brought into contact with the periphery of the channel of the pivoted window frame.

Rearward of the pivots 12 and 13 the arms 25 and 26 are positioned as shown in Fig. 3 with the arm 26 to the left of the upright arm 25. Closing movement of the window causes it to contact the upright arm 25 as indicated by the arrow and this causes a pivoting of the arm 25 about a point located in the neck 23 and brings the side arm 26 into engagement with the periphery of the window frame or channel 18.

In either instance the arms 25 and 26 are maintained in a weather sealing contact on each side of the center line of the peripheral edge portion of the channel 18 when the window is in the closed position as shown in Fig. 6.

The respective parts are so arranged and located that when the pivoted window is closed as shown in Fig. 6, the periphery of the window channel 18 spreads the arms 25 and 26 and thus increases the sealing pressure exerted by the arms on the periphery of the channel. A pressure is also exerted against the neck 23 which is thus subjected to compression forces when the window is closed. This eliminates the possibility of failures due to overstressing the neck 23 while in tension.

From the foregoing, it will be seen that torsional forces are imposed on the sealing bead during the progressive angular closing action of the pivotally mounted window. These forces are sufficient to overcome the resistance of the sealing bead and cause it to twist. The resiliency of the bead and the neck together exert a counterforce to the twisting forces which attempt to return the parts to their unstressed positions. This causes the bead to exert a continual sealing pressure against the periphery of the frame of the pivoted window at all times until the displacing torsional forces are released upon opening of the window. This assures a positive weather tight sealing of the window when closed.

Having thus described my invention, I claim:

1. A weather seal for providing a weather-tight seal between a pivotally mounted window and the window opening in which it is mounted and comprising a base for mounting in the window opening, a resilient substantially L-shaped bead extending longitudinally of said base, and a flexible connecting member connecting said bead and said base to permit bodily displacement of said bead for establishing weather sealing contacts with the peripheral edge portion of the pivotally mounted window when closed.

2. A weather seal as claimed in claim 1 and further characterized in that the flexible connecting member between said resilient bead and said base comprises a continuous resilient elongated neck extending longitudinally of said bead.

3. A weather seal adapted for mounting in a window opening for sealing a pivotally mounted window and comprising a base and a resilient substantially L-shaped bead flexibly connected therewith for bodily tilting relative to said base upon contact of the upright arm thereof with the peripheral edge of the pivotally mounted window, said weather seal being located entirely between the peripheral edge of the closed pivotally mounted window and the window opening.

4. In an automobile window construction having a window pivotally mounted in the window opening, a weather seal bodily disposed entirely between the window opening and the peripheral edge portion of the said window, and comprising a base mounted adjacent the periphery of the window opening and a resilient substantially L-shaped sealing bead flexibly connected with said base and having an upright arm extending into the path of the said window for contact with the peripheral edge thereof upon closing movement to establish a weather sealing contact on one side of the center line of the periphery of said window and to tilt said bead and cause the side arm thereof to establish a positive weather sealing contact on the other side of the center line of the periphery of said window.

5. A continuous resilient sealing member of uniform cross-sectional form made of a resilient plastic material for sealing the space between the swinging pivotally mounted windows of an automotive vehicle and the window openings therefor when said windows are closed into the window openings, said sealing member consisting of a body for mounting in the window opening and a sealing bead connected to and positively spaced from said mounting body by a flexible elongated neck, said sealing bead comprising an upright arm and a side arm extending angularly thereto in the direction of closing movement of said window, said bead being of sufficient resiliency to twist and roll against the periphery of the said pivotally mounted window during progressive angular closing movement of said window and to return to its normal unstressed position when the window is open.

6. An automobile window construction of the type having a window opening and a pivoted window pivotally mounted in said opening, said window construction having in combination with said opening and with said pivoted window a sealing strip attached to said window construction and extending along at least one side of said opening for engagement with the adjacent peripheral edge of said window, said sealing strip having a portion attached securely to said construction, and a substantially L-shaped sealing bead comprising an upright arm and an angularly disposed side arm disposed in the window opening for engagement with the periphery of said pivoted window and connected to the attached portion of the strip by a flexible neck which permits said sealing bead to roll bodily to either side of the longitudinal center line of said attached portion when engaged by said pivoted window.

References Cited in the file of this patent

UNITED STATES PATENTS

| Number | Name | Date |
|---|---|---|
| 2,606,059 | Wernig | Aug. 5, 1952 |

FOREIGN PATENTS

| Number | Country | Date |
|---|---|---|
| 581,038 | Germany | July 20, 1933 |
| 602,276 | Germany | Sept. 5, 1934 |
| 634,860 | Germany | Sept. 5, 1936 |